United States Patent
Maleki et al.

(10) Patent No.: US 6,797,427 B2
(45) Date of Patent: Sep. 28, 2004

(54) SYSTEM FOR ENHANCED LITHIUM-ION BATTERY PERFORMANCE AT LOW TEMPERATURES

(75) Inventors: Hossein Maleki, Lawrenceville, GA (US); Anaba Anani, Lawrenceville, GA (US); Ganesh Venugopal, Duluth, GA (US)

(73) Assignee: Motorola, Inc., Schaumburg, IL (US)

( * ) Notice: Subject to any disclaimer, the term of this patent is extended or adjusted under 35 U.S.C. 154(b) by 199 days.

(21) Appl. No.: 09/925,199

(22) Filed: Aug. 9, 2001

(65) Prior Publication Data

US 2003/0031922 A1 Feb. 13, 2003

(51) Int. Cl.[7] .............................................. H01M 10/50
(52) U.S. Cl. ................... 429/120; 429/149; 429/153; 429/159; 429/163; 62/457.7
(58) Field of Search ................. 429/120, 149, 429/153, 159, 163; 62/457.7

(56) References Cited

U.S. PATENT DOCUMENTS 6,192,703 B1 * 2/2001 Salyer et al. .............. 62/457.7
6,468,689 B1 * 10/2002 Hallaj et al. ................ 429/120

OTHER PUBLICATIONS

Datasheet For CoolPhase MPC–120, Lord Chemical Products, Aug. 22, 2001.

* cited by examiner

*Primary Examiner*—Dah-Wei Yuan
(74) *Attorney, Agent, or Firm*—Philip H. Burrus, IV

(57) ABSTRACT

A battery for use in various temperature environments includes a plurality of cells arranged in a close packing arrangement and a sleeve that is disposed around the cells. The sleeve is constructed from a material that acts as an insulator at relatively low temperatures and that acts as a conductor at relatively high temperatures.

3 Claims, 2 Drawing Sheets

SYSTEM FOR ENHANCED LITHIUM-ION BATTERY PERFORMANCE AT LOW TEMPERATURES

BACKGROUND OF THE INVENTION

1. Field of the Invention

The present invention relates to battery systems and, more particularly, to a battery system adapted for use at varying temperatures.

2. Description of the Prior Art

Present lithium-ion (Li-ion) cells demonstrate low operating efficiency, and a corresponding low discharge capacity, at temperatures below 20° C. While a Li-ion cell may demonstrate a low discharge capacity at a low temperature, it will recover to a normal discharge capacity when the ambient temperature returns to a higher value.

Li-ion cells generate heat during discharge. Therefore, insulating a Li-ion cell during use at low temperatures causes the cell to demonstrate a higher discharge capacity than if it were uninsulated. However, maintaining the insulation on the cell when the cell is used in a higher temperature environment could have negative effects on the cell because of excess accumulation of heat.

Therefore, there is a need for an apparatus that retains heat in Li-ion cells while operating at relatively low temperatures, and that conducts heat from the cells while operating at higher temperatures.

DETAILED DESCRIPTION OF THE INVENTION

Figure 1:
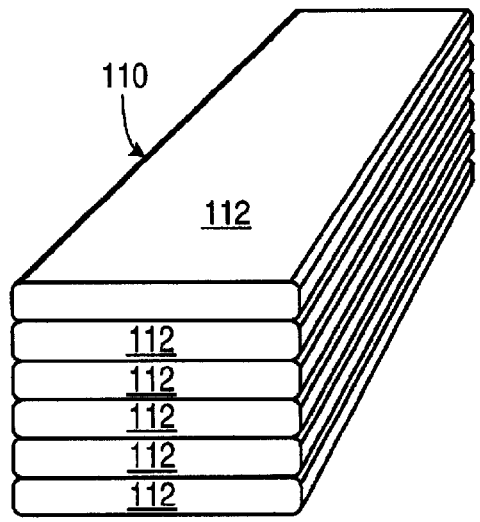
FIG. 1 is a perspective view of a plurality of prismatic cells in a close packing arrangement.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Figure 2:
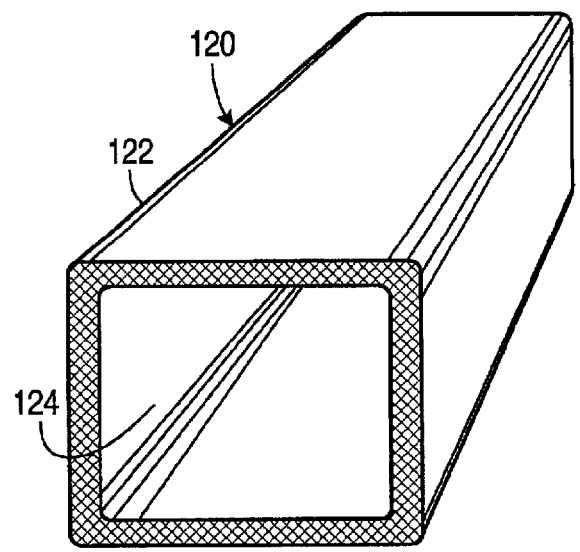
FIG. 2 is a perspective view of an insulating sleeve according to one embodiment of the invention.
Figure 3:
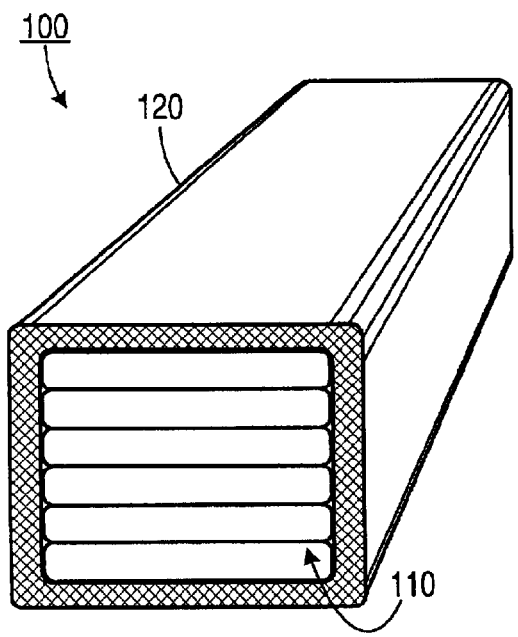
FIG. 3 is a perspective view of the cells shown in FIG. 1 disposed in the sleeve shown in FIG. 2.

As shown in FIGS. 1–3, one embodiment of the invention is a battery 100 for use in various temperature environments. A plurality 110 of cells 112, such as lithium-ion cells, are arranged in a close packing arrangement, such as stacked. This arrangement takes advantage of the fact that closely packed cells 112 have less surface area exposed to lower temperature environments than cells arranged, for example, end-to-end. A jacket 120 includes a sleeve 122 that defines a cavity 124 that is complementary in shape to the plurality 110 of cells 112. The sleeve 122 is disposed around the cells 112. The sleeve 122 is made from a material that acts as an insulator at relatively low temperatures and that acts as a conductor at relatively high temperatures. Typically, the sleeve 122 is constructed from a phase change material, also referred to as a cool phase material. One illustrative example of a phase change material that has been used in experimental studies of the invention is Coolphase™ MPC-120, available from Thermoset, Lord Chemical Products, 5101 East 65th Street, Indianapolis, Ind. 46220. It has been found that this material works well for single transitions from a cold environment to a warm environment. However, a sleeve 122 made of this material should be replaced after each cold-to-warm temperature transition when multiple transitions occur. While FIG. 3 shows the sleeve 122 wrapped around a stack of cells 112, individual sleeves could also be wrapped around individual cells 112 without departing from the scope of the invention.

Figure 4:
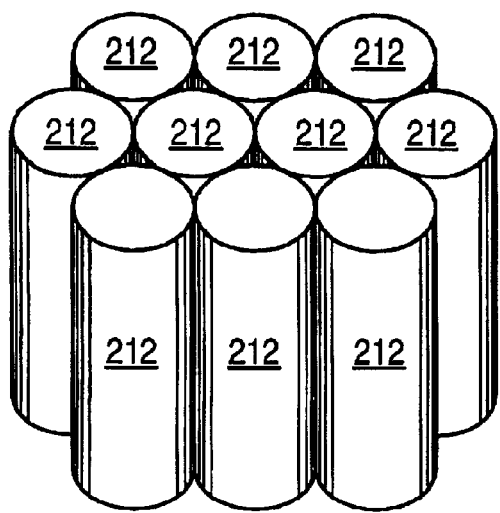
FIG. 4 is a perspective view of a plurality of cylindrical cells in a close packing arrangement.
Figure 5:
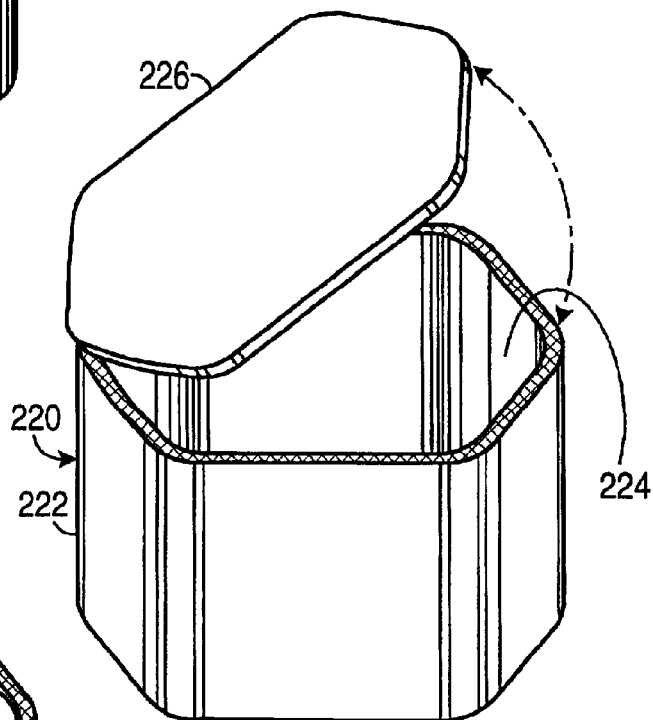
FIG. 5 is a perspective view of an insulating sleeve according to one embodiment of the invention.
Figure 6:
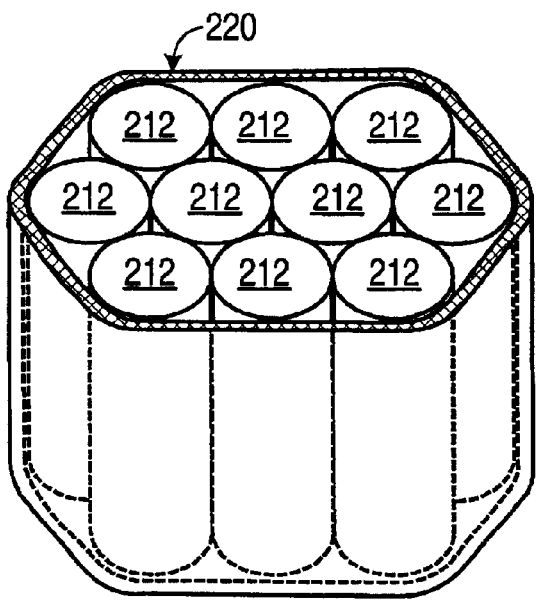
FIG. 6 is a perspective view of the cells shown in FIG. 4 disposed in the sleeve shown in FIG. 5.

An alternate embodiment, designed for use with cylindrical cells 212 is shown in FIGS. 4–6. The jacket 220 includes a sleeve 222 that defines a cavity 224 into which the cells 212 are placed. A lid 226 made of the phase change material may also be supplied to provide additional insulation.

Li-ion cells self heat during discharge. Such temperature response is attributed to the effect of current on cell polarization and IR impedance. The rate and quantity of heat generation depends on the discharge current and ambient temperature. Unless the heat is dissipated from the cells, the heat becomes available to self heat the cells. The invention takes advantage of the self heating of lithium ion cells to improve discharge capacity to values higher than presently achieved at low temperatures by uninsulated cells.

This invention allows one type of cell to be manufactured for both cold environments and warm environments. If used in a cold environment, the phase change material acts as an insulator, whereas if used in a warm environment, the phase change material is capable of increasing its thermal conductivity and act as a conductor. With advances in phase change material technology, multiple transitions will be possible, thereby allowing one to go back and forth between the arctic and the tropics with one battery.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. A battery for use in various temperature environments, comprising:
   a. at least one electro-chemical cell; and
   b. a sleeve disposed around the at least one electro-chemical cell, the sleeve comprising a material that acts as an insulator at relatively low temperatures and that acts as a conductor at relatively high temperatures, wherein the material that acts as an insulator at relatively low temperatures and that acts as a conductor at relatively high temperatures comprises an aluminum filled thermally conductive phase change material.

2. The battery of claim 1, wherein the electro-chemical cell comprises a lithium-ion cell.

3. A battery for use in various temperature environments, comprising:
   a. a plurality of lithium-ion cells, the plurality of lithium-ion cells being arranged in a close packing arrangement; and b. a sleeve disposed around the lithium ion cells, the sleeve comprising a material that acts as an insulator at relatively low temperatures and that acts as a conductor at relatively high temperatures, wherein the material that acts as an insulator at relatively low temperatures and that acts as a conductor at relatively high temperatures comprises an aluminum filled thermally conductive phase change material.

* * * * *